US010154390B2

(12) United States Patent
Kobayashi

(10) Patent No.: US 10,154,390 B2
(45) Date of Patent: Dec. 11, 2018

(54) DISASTER INFORMATION MANAGEMENT APPARATUS, DISASTER INFORMATION SYSTEM, DISASTER INFORMATION MANAGEMENT METHOD, DISASTER INFORMATION MANAGEMENT PROGRAM, PORTABLE TERMINAL, CONTROL METHOD OF PORTABLE TERMINAL, AND CONTROL PROGRAM OF CONTROLLING OPERATION OF PORTABLE TERMINAL

(71) Applicant: NEC Corporation, Tokyo (JP)

(72) Inventor: Yoshikazu Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 125 days.

(21) Appl. No.: 14/434,080

(22) PCT Filed: Sep. 30, 2013

(86) PCT No.: PCT/JP2013/076519
§ 371 (c)(1),
(2) Date: Apr. 7, 2015

(87) PCT Pub. No.: WO2014/057835
PCT Pub. Date: Apr. 17, 2014

(65) Prior Publication Data
US 2015/0264547 A1    Sep. 17, 2015

(30) Foreign Application Priority Data

Oct. 9, 2012  (JP) .................................. 2012-224210

(51) Int. Cl.
*H04W 4/22*  (2009.01)
*H04W 4/02*  (2018.01)
(Continued)

(52) U.S. Cl.
CPC .............. *H04W 4/22* (2013.01); *G06Q 50/26* (2013.01); *G08B 21/10* (2013.01); *G08B 21/12* (2013.01);
(Continued)

(58) Field of Classification Search
CPC ......... H04W 4/02; H04W 4/22; H04W 64/00; G08B 25/00; G08B 1/00; G06F 19/00; G06Q 10/00; G06Q 50/00
See application file for complete search history.

(56) References Cited

U.S. PATENT DOCUMENTS

2005/0197775 A1   9/2005  Smith
2005/0240378 A1  10/2005  Smith et al.
(Continued)

FOREIGN PATENT DOCUMENTS

JP    2000-184071 A    6/2000
JP    2006-005550 A    1/2006
(Continued)

OTHER PUBLICATIONS

Extended European Search Report issued in corresponding to European Application No. 13844696.8, dated Feb. 19, 2016, 10 pages.
(Continued)

*Primary Examiner* — Nizar N Sivji
(74) *Attorney, Agent, or Firm* — Wilmer Cutler Pickering Hale and Dorr LLP

(57) ABSTRACT

To attempt to extend a providing service by allowing collection of various kinds of information and early restoration of a defective function in a disaster response infrastructure network, in a disaster information system, a disaster information management apparatus for collecting disaster information via a network includes a terminal information acquirer that acquires terminal information including the current position and identification information of a portable
(Continued)

terminal, a need information generator that generates, from received disaster information, need information including information about a need which can be satisfied by the operation of an apparatus, and a request information generator that generates, based on the terminal information and the need information, request information for requesting the portable terminal existing within a range of a predetermined distance from the occurrence location of the need to operate the apparatus necessary for satisfying the need, and transmits the request information.

16 Claims, 11 Drawing Sheets

(51) Int. Cl.
| | |
|---|---|
| H04W 64/00 | (2009.01) |
| G06Q 50/26 | (2012.01) |
| G08B 21/10 | (2006.01) |
| G08B 21/12 | (2006.01) |
| G08B 27/00 | (2006.01) |
| H04W 4/90 | (2018.01) |

(52) U.S. Cl.
CPC ............ *G08B 27/005* (2013.01); *H04W 4/02* (2013.01); *H04W 4/90* (2018.02); *H04W 64/00* (2013.01)

(56) References Cited

U.S. PATENT DOCUMENTS

| | | | |
|---|---|---|---|
| 2007/0296574 A1 | 12/2007 | Smith et al. | |
| 2008/0167001 A1* | 7/2008 | Wong | G06F 21/43 455/411 |
| 2009/0284348 A1* | 11/2009 | Pfeffer | G08B 25/006 340/7.3 |
| 2010/0315230 A1 | 12/2010 | Kwon et al. | |
| 2011/0237287 A1* | 9/2011 | Klein | H04M 3/42178 455/521 |
| 2012/0190295 A1 | 7/2012 | Kim et al. | |
| 2013/0060729 A1* | 3/2013 | Massey | G06Q 10/00 707/600 |
| 2014/0084165 A1* | 3/2014 | Fadell | G08B 17/00 250/340 |

FOREIGN PATENT DOCUMENTS

| | | |
|---|---|---|
| JP | 2008-234443 A | 10/2008 |
| JP | 2009-180687 A | 8/2009 |
| JP | 2010-157881 A | 7/2010 |
| JP | 2010-271857 A | 12/2010 |
| JP | 2011-210205 A | 10/2011 |
| JP | 2012-058904 A | 3/2012 |

OTHER PUBLICATIONS

International Search Report, Corresponding to PCT/JP2013/076519, dated Jan. 7, 2014, 1 page.

Japanese Notice of Reasons for Rejection issued in corresponding Japanese Patent Application No. 2012-224210, dated Oct. 18, 2016, 6 pages.

* cited by examiner

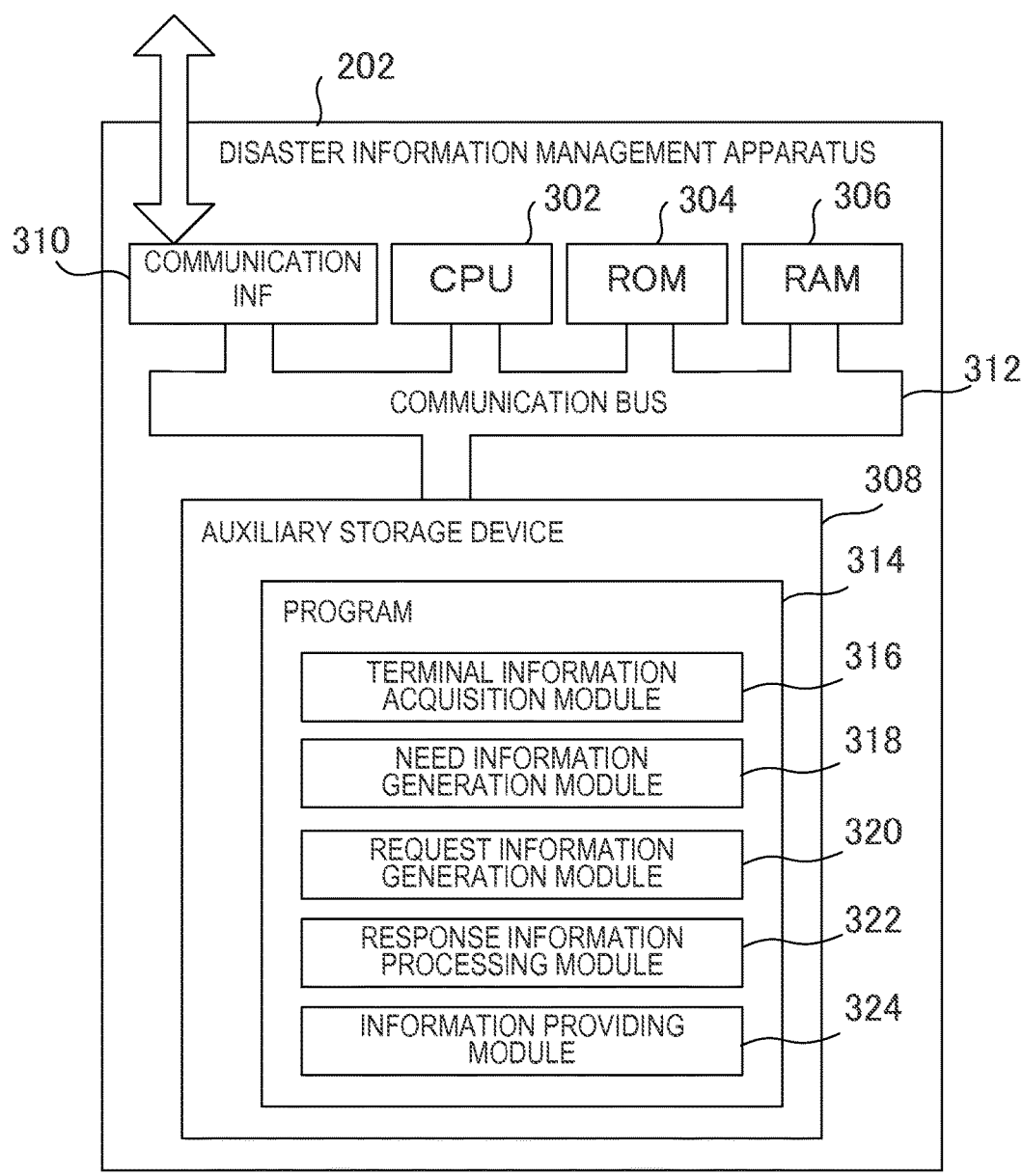
F I G. 3

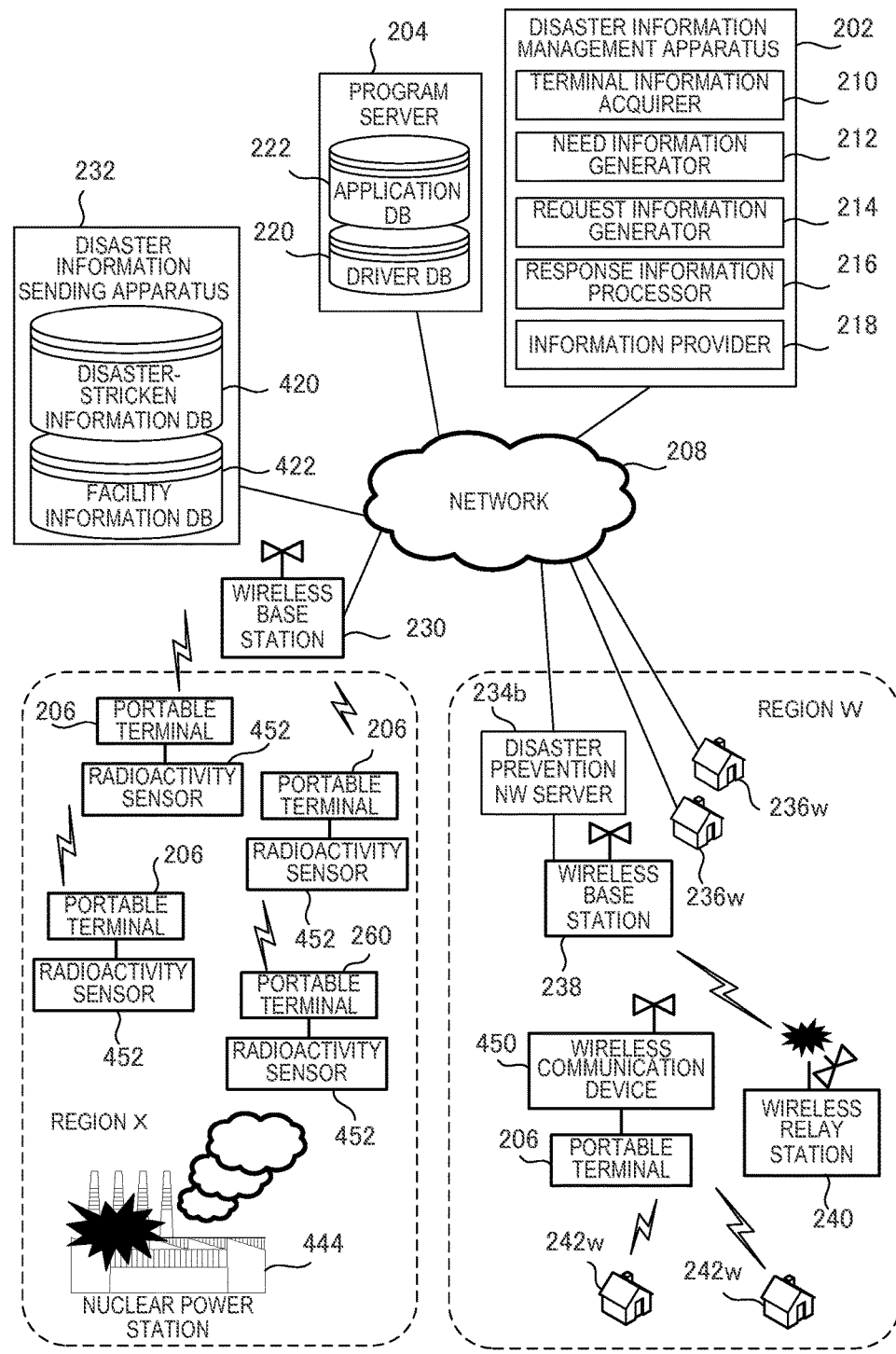
F I G. 4

500

| CATEGORY | NEED CONTENTS | NEED OCCURRENCE LOCATION |
|---|---|---|
| FUNCTION RESTORATION | WIRELESS RELAY APPARATUS | WIRELESS RELAY STATION 240 OF REGION W (ADDRESS:...) |
| INFORMATION ADDITION | RADIATION DATA | ENTIRE...AREA OF REGION X |
| | | |

FIG. 5

600 

| IDENTIFICATION ID | CATEGORY | NEED CONTENTS | NEED OCCURRENCE LOCATION | NEED SATISFACTION UNIT | |
|---|---|---|---|---|---|
| | | | | APPARATUS MODEL NUMBER | PROCUREMENT LOCATION |
| ID11, ID12, ID13, ··· | FUNCTION RESTORATION | WIRELESS RELAY APPARATUS | WIRELESS RELAY STATION 240 OF REGION W (ADDRESS:...) | ABC307, ABC308, ABC309, ··· | ...CITY HALL OF REGION W (ADDRESS:...) |
| ID21, ID22, ID23, ··· | INFORMATION ADDITION | RADIATION DATA | ENTIRE...AREA OF REGION X | DEF407, DEF408, DEF409, ··· | DISASTER PREVENTION CENTER OF...AREA OF REGION X (ADDRESS:...) |
| ID31, ID32, ID33, ··· | INFORMATION ADDITION | RADIATION DATA | ENTIRE...AREA OF REGION X | GHI207, DEFC307, GHI208-J, ··· | ...CITY HALL OF REGION X (ADDRESS:...) |
| ID41, ID42, ID43, ··· | INFORMATION ADDITION | RADIATION DATA | ENTIRE...AREA OF REGION X | DEF408V2, GHI555, GHI570, ··· | FIRE STATION OF...CITY OF REGION X (ADDRESS:...) |

FIG. 6

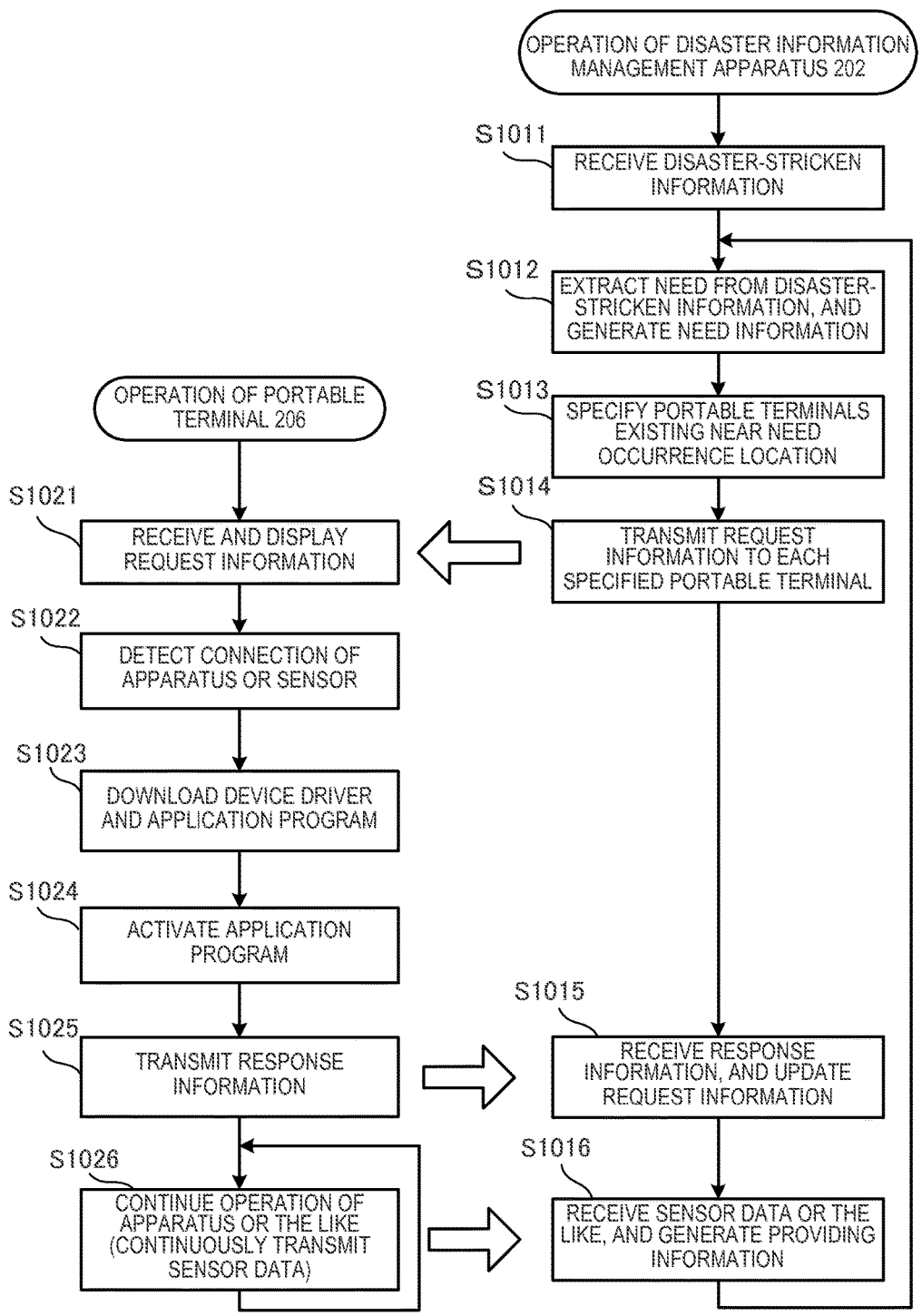
F I G. 10

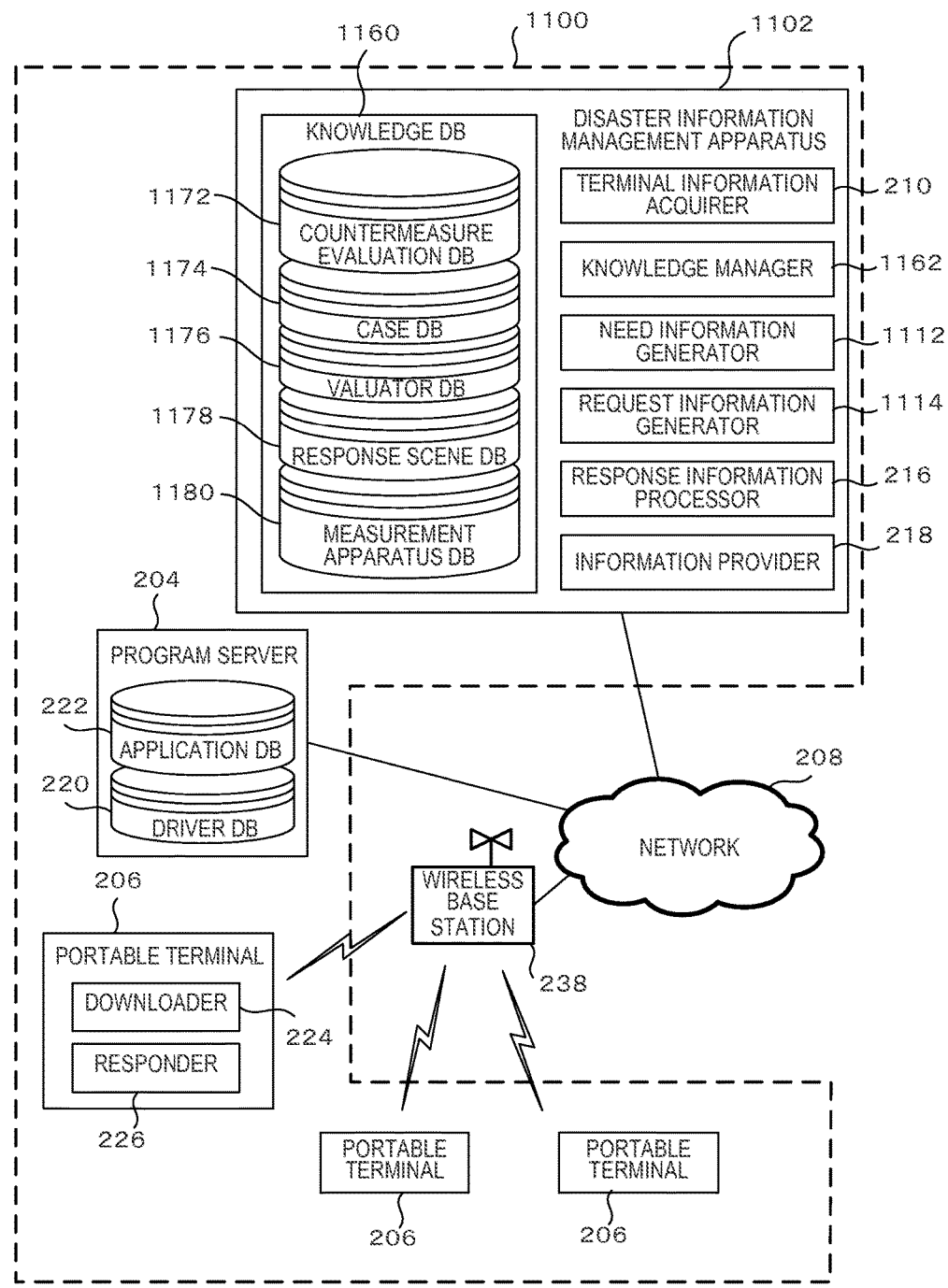
F I G. 11

DISASTER INFORMATION MANAGEMENT APPARATUS, DISASTER INFORMATION SYSTEM, DISASTER INFORMATION MANAGEMENT METHOD, DISASTER INFORMATION MANAGEMENT PROGRAM, PORTABLE TERMINAL, CONTROL METHOD OF PORTABLE TERMINAL, AND CONTROL PROGRAM OF CONTROLLING OPERATION OF PORTABLE TERMINAL

CROSS-REFERENCE TO RELATED APPLICATIONS

The present application is a national stage application of International Application No. PCT/JP2013/076519 entitled "Disaster Information Management Apparatus, Disaster Information System, Disaster Information Management Method, Disaster Information Management Program, Portable Terminal, Control Method of Portable Terminal, and Control Program of Controlling Operation of Portable Terminal," filed on Sep. 30, 2013, which claims the benefit of priority from Japanese Patent Application No. JP2012-224210, filed on Oct. 9, 2012, the disclosures of which are incorporated herein in their entirety by reference thereto.

TECHNICAL FIELD

The present invention relates to a disaster information management technique of collecting and providing information about a disaster such as an earthquake or fire.

BACKGROUND ART

Patent literature 1 describes a "disaster information processing apparatus" that collects information from the mobile terminals of users in addition to information provided by an administrative agency, generates a hazard map of a disaster-stricken area, and guides an evacuation of the users more safely based on the hazard map at the time of occurrence of a disaster. This apparatus includes a server connected to a network. When the server receives disaster occurrence information from the information sending apparatus of an administrative agency such as the Meteorological Agency, the apparatus receives pieces of position information sent by the mobile terminals to specify disaster victim users in a disaster area. The apparatus also transmits safety confirmation inquiry information to the mobile terminals of the disaster victim users, generates a hazard map based on pieces of answer information (including pieces of risk information of the users) returned from the disaster victim users, and transmits information indicating an evacuation route to the mobile terminal of each user.

Furthermore, although disaster information is not processed, patent literature 2 describes, as an information collection technique using a portable terminal, an "insurance transaction system and insurance transaction method" in which a portable terminal with a camera and a transaction center system are connected via a network. In this system, a document such as a customer contract is captured by the portable terminal with the camera, the captured image is transmitted to the center system, and the center system creates text information by character recognition based on the received captured image. The text information is classified and stored based on a keyword or the like included in the text.

Patent literature 3 describes a "vibration monitoring system" in which a plurality of vibration monitoring apparatuses each including a vibration sensor and a personal computer are connected to a server via a network. The server has a function of improving the accuracy of vibration data by detecting and removing error data based on vibration data transmitted from the respective apparatuses and the positions of the apparatuses.

CITATION LIST

Patent Literature

Patent literature 1: Japanese Patent Laid-Open No. 2011-210205
Patent literature 2: Japanese Patent Laid-Open No. 2012-58904
Patent literature 3: Japanese Patent Laid-Open No. 2009-180687

SUMMARY OF THE INVENTION

Technical Problem

In the apparatus described in patent literature 1, disaster-stricken area information is complemented by information from the user of a portable terminal. However, the information is about the safety of the user and contents are limited. The risk information included in the answer information is subjective information of the user, and the reliability of the information readily varies. The apparatus described in patent literature 1 has to mainly provide a conventional information providing service that mainly collects information from an administrative agency and provides it by broadcasting, and has room for improvement in terms of utilization of a portable terminal.

In the systems described in patent literatures 2 and 3, information to be collected is limited to document information and vibration information. Therefore, the systems are not suitable for flexibly acquiring various kinds of information required at the time of a disaster at various locations in accordance with the situation of each region.

Furthermore, if some apparatuses in a disaster response infrastructure network such as a local government disaster prevention system suffer from a disaster to lose functionality at the time of occurrence of the disaster, it is very important to quickly restore the functions of the apparatuses. However, the apparatus described in patent literature 1 and the systems described in patent literatures 2 and 3 cannot promote function restoration.

The present invention enables to provide a technique of solving the above-described problem.

Solution to Problem

One aspect of the present invention provides a disaster information management apparatus connected to a network, comprising:
a terminal information acquirer that acquires terminal information including a current position and identification information of a portable terminal connected to the network;
a need information generator that generates, from disaster information received from the network, need information including information about a need which can be satisfied by an operation of an apparatus; and
a request information generator that generates, based on the terminal information and the need information, request information for requesting the portable terminal existing within a range of a predetermined distance from an occurrence location of the need to operate the apparatus necessary for satisfying the need, and transmits the request information.

Another aspect of the present invention provides a disaster information management method of a disaster information management apparatus connected to a network, comprising:

acquiring terminal information including a current position and identification information of a portable terminal connected to the network;

generating, from disaster information received from the network, need information including information about a need which can be satisfied by an operation of an apparatus; and generating, based on the terminal information and the need information, request information for requesting the portable terminal existing within a range of a predetermined distance from an occurrence location of the need to operate the apparatus necessary for satisfying the need, and transmitting the request information.

Still other aspect of the present invention provides a disaster information management method of a disaster information management apparatus connected to a network, comprising:

causing the disaster information management apparatus connected to the network to acquire terminal information including a current position and identification information of a portable terminal connected to the network;

causing the disaster information management apparatus to generate, from disaster information received from the network, need information including information about a need which can be satisfied by an operation of an apparatus;

causing the disaster information management apparatus to generate, based on the terminal information and the need information, request information for requesting the portable terminal existing within a range of a predetermined distance from an occurrence location of the need to operate the apparatus necessary for satisfying the need, and transmit the request information;

causing the portable terminal to receive and display the request information;

causing the portable terminal to download, in response to connection of the apparatus requested to operate by the request information, a software program necessary for operating the connected apparatus from a program server via the network; and causing the portable terminal to operate the connected apparatus using the downloaded software program.

Still other aspect of the present invention provides a disaster information management program for causing a computer of a disaster information management apparatus connected to a network to execute a method, comprising:

acquiring terminal information including a current position and identification information of a portable terminal connected to the network;

generating, from disaster information received from the network, need information including information about a need which can be satisfied by an operation of an apparatus; and generating, based on the terminal information and the need information, request information for requesting the portable terminal existing within a range of a predetermined distance from an occurrence location of the need to operate the apparatus necessary for satisfying the need, and transmitting the request information.

Still other aspect of the present invention provides a portable terminal communicably connected, via a network, to a disaster information management apparatus that transmits request information for requesting an operation of an apparatus, comprising:

a connection interface with an apparatus;

a downloader that receives the request information transmitted by the disaster information management apparatus, and downloads, in response to connection of the apparatus requested to operate by the request information to said connection interface, a software program necessary for operating the apparatus from a server via the network; and a responder that operates the apparatus connected to said connection interface by executing the downloaded software program, and transmits, to the disaster information management apparatus, response information which includes information about an operation status of the apparatus and indicates a response status to the request.

Still other aspect of the present invention provides a control method of a portable terminal communicably connected, via a network, to a disaster information management apparatus that transmits request information for requesting an operation of an apparatus, comprising:

receiving the request information transmitted by the disaster information management apparatus;

downloading, in response to connection of the apparatus requested to operate by the request information to a connection interface of a local apparatus, a software program necessary for operating the apparatus from a server via the network;

operating the apparatus connected to the connection interface by executing the downloaded software program; and transmitting, to the disaster information management apparatus, response information which includes information about an operation status of the apparatus and indicates a response status to the request.

Still other aspect of the present invention provides a control program, of controlling an operation of a portable terminal communicably connected, via a network, to a disaster information management apparatus that transmits request information for requesting an operation of an apparatus, for causing a computer to execute a method, comprising:

receiving the request information transmitted by the disaster information management apparatus;

downloading, in response to connection of the apparatus requested to operate by the request information to a connection interface of a local apparatus, a software program necessary for operating the apparatus from a server via the network;

operating the apparatus connected to the connection interface by starting execution of the downloaded software program; and transmitting, to the disaster information management apparatus, response information which includes information about an operation status of the apparatus and indicates a response status to the request.

Advantageous Effects of Invention

According to the present invention, in a disaster information system, an attempt can be made to extend a providing service by allowing collection of various kinds of information and early restoration of defective functions in a disaster response infrastructure.

BRIEF DESCRIPTION OF DRAWINGS

FIG. 3 is a block diagram showing an example of the hardware arrangement of a disaster information management apparatus constituting the disaster information system according to the second embodiment of the present invention;

FIG. 4 is a view showing an example of a disaster-stricken situation in which the disaster information system operates according to the second embodiment of the present invention;

FIG. 5 is a table showing an example of a need information table generated by the need information generator of the disaster information management apparatus in the situation shown in FIG. 4;

FIG. 6 is a table showing an example of a request information table generated by the request information generator of the disaster information management apparatus based on need information shown in FIG. 5;

FIG. 10 is a flowchart illustrating the operation procedure of the disaster information system according to the second embodiment of the present invention; and FIG. 11 is a block diagram showing the arrangement of a disaster information system according to the third embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

[First Embodiment]

Figure 1:
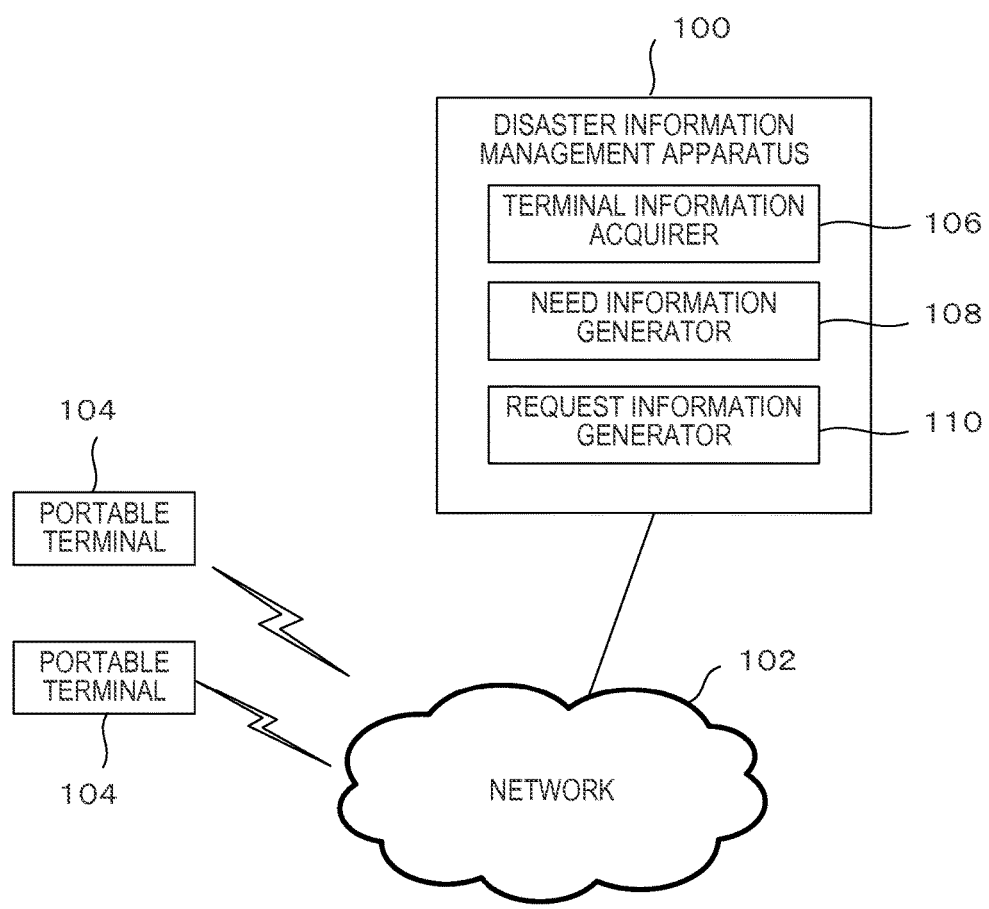
FIG. 1 is a block diagram showing the arrangement of a disaster information management apparatus according to the first embodiment of the present invention.

FIG. 1 is a block diagram showing the arrangement of a disaster information management apparatus according to the first embodiment of the present invention.

A disaster information management apparatus 100 is an apparatus communicably connected to portable terminals 104 via a network 102 and used, and includes a terminal information acquirer 106, a need information generator 108, and a request information generator 110.

The terminal information acquirer 106 acquires terminal information including the current position and identification ID as identification information of each portable terminal 104 connected to the network 102. Based on disaster information received from the network 102, the need information generator 108 generates need information including information about a need which can be satisfied by the operation of an apparatus. Based on the terminal information and need information, the request information generator 110 generates request information for requesting each portable terminal 104 existing within a range of a predetermined distance from the occurrence location of the need to operate the apparatus necessary for satisfying the need, and transmits the request information.

With the above arrangement, an attempt can be made to extend a providing service by allowing collection of various kinds of information and early restoration of defective functions in a disaster response infrastructure.

[Second Embodiment]

Figure 2:
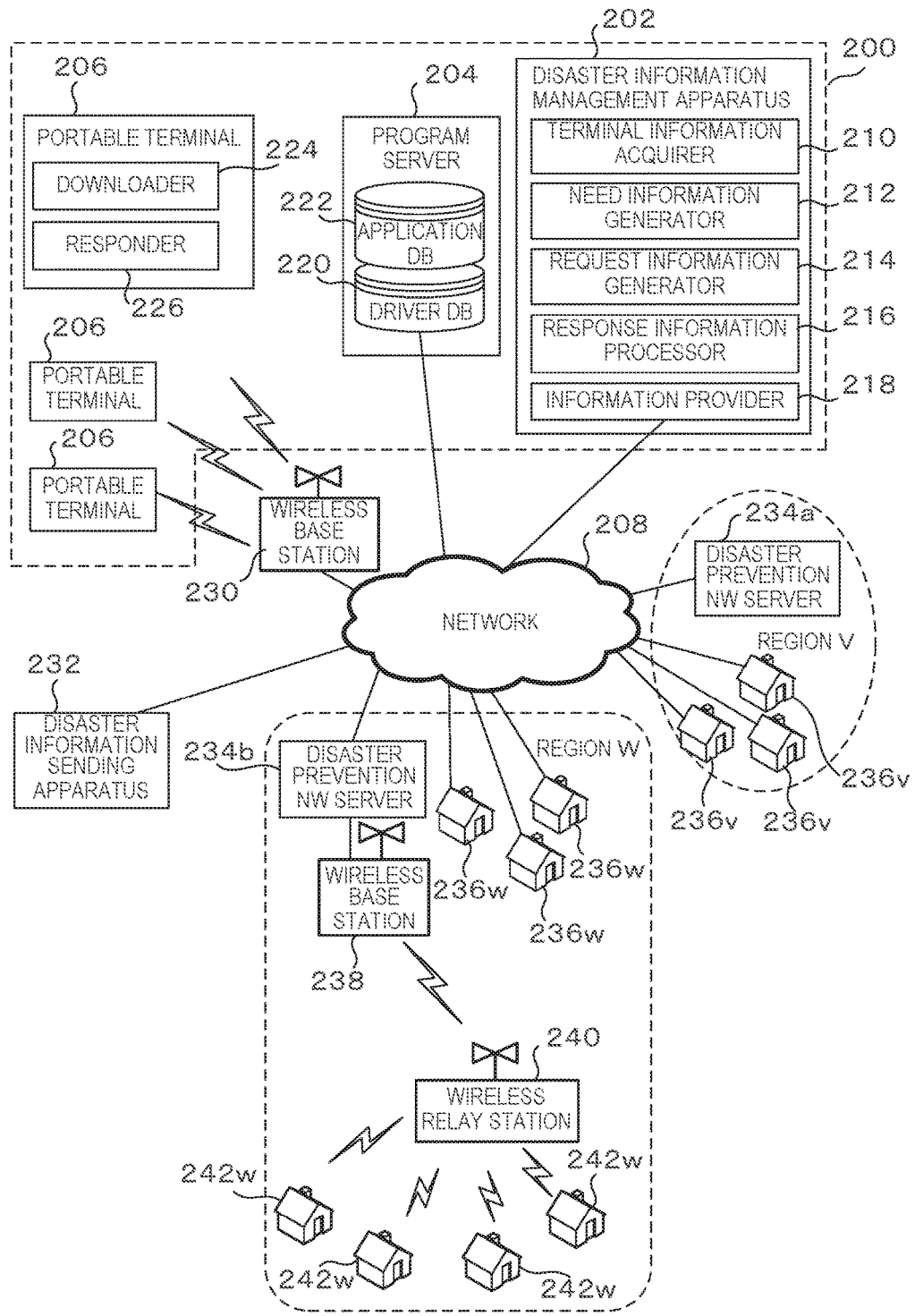
FIG. 2 is a block diagram showing the arrangement of a disaster information system according to the second embodiment of the present invention.

FIG. 2 is a block diagram showing the arrangement of a disaster information system according to the second embodiment of the present invention.

A disaster information system 200 includes a disaster information management apparatus 202, a program server 204, and portable terminals 206, all of which are connected to a network 208.

The network 208 can be a wide area network used for so-called cloud computing including the Internet. The information transmission method of the network 208 may be a wired or wireless transmission method or a combination thereof.

The network 208 is connected to a wireless apparatus (not shown) of a wireless base station 230 for connecting the portable terminals 206 to the network 208. The network 208 is also connected to the information sources of various kinds of disaster information which constitute a so-called disaster response infrastructure network. For example, the network 208 is connected to a disaster information sending apparatus 232 provided in an administrative agency such as the Meteorological Agency, a fire station, or police station, disaster prevention network servers 234a and 234b of local governments, and the like.

The disaster prevention network servers 234a and 234b of the local governments are connected to computers (not shown) in facilities 236v and 236w in regions V and W under the local governments via the wide area network 208, thereby creating disaster prevention networks in the respective local governments. The disaster prevention network server 234b in the region W is connected to a wireless station 238 as part of the disaster prevention network. Disaster information sent by the disaster prevention network server 234b is transmitted from the wireless station 238 in the region W, and received by facilities 242w at remote locations via a wireless relay station 240 installed in the region. This provides information from the disaster prevention network server 234b to the facilities 242w outside the service area of the network 208.

The disaster information management apparatus 202 is a computer including a CPU (Central Processing Unit) and storage devices such as a RAM (Random Access Memory) and ROM (Read Only Memory), and includes a terminal information acquirer 210, a need information generator 212, a request information generator 214, a response information processor 216, and an information provider 218.

In this embodiment, the terminal information acquirer 210, need information generator 212, request information generator 214, response information processor 216, and information provider 218 are implemented when the disaster information management apparatus 202 as a computer executes a program. For example, the disaster information management apparatus 202 includes a CPU 302, a ROM 304, a RAM 306, an auxiliary storage device 308 such as a fixed disk device, a communication interface 310, and a communication bus 312, as shown in FIG. 3.

The CPU 302 operates by reading out a program 314 stored in the auxiliary storage device 308, and executing it. The CPU 302 executes a terminal information acquisition module 316, a need information generation module 318, a request information generation module 320, a response information processing module 322, and an information providing module 324. With this operation, the CPU 302 implements the functions of the terminal information acquirer 210, need information generator 212, request information generator 214, response information processor 216, and information provider 218 shown in FIG. 2.

Note that the terminal information acquirer 210, need information generator 212, request information generator 214, response information processor 216, and information provider 218 can be arranged as hardware devices for implementing the functions by individual electric circuits.

The terminal information acquirer 210 of the disaster information management apparatus 202 acquires terminal information including the current position and identification ID of each portable terminal 206 connected to the network 208. The current position and identification ID of each portable terminal 206 can be acquired when the disaster information management apparatus 202 receives, for example, so-called probe information sent by the portable terminal 206 at a predetermined time interval. The terminal information acquirer 210 stores the acquired terminal information in, for example, the auxiliary storage device 308 shown in FIG. 3.

Based on disaster information received from the network 208, the need information generator 212 generates need information including information about various needs arising in association with a disaster, especially, a need which can be satisfied by the operation of an apparatus. Note that the disaster information includes information from various knowledge databases connected to the network 208, for example, information from the disaster information sending apparatus 232 provided in an administrative agency such as the Meteorological Agency, a fire station, or a police station, or the disaster prevention network server 234a or 234b of the local government. Various kinds of information communicated on the network 208 in association with a disaster, such as information provided in an SNS (Social Networking Service) and pieces of information provided from the web sites of universities and other research institutions, can also be used as pieces of disaster information.

The need information generator 212 collects pieces of information about needs for disaster restoration from the pieces of disaster information, and extracts information about a need which is satisfied by operating a specific apparatus. The need information generator 212 then generates need information for associating the contents of the need with a location (need occurrence location) where the need has arisen. Examples of the need are a need about early restoration of an apparatus (for example, a wireless relay apparatus) in the disaster response infrastructure network which has stopped by suffering from a disaster, and a need about addition of a lack of sensor information (for example, radiation dose data in each region).

As a method of extracting pieces of information about various needs from disaster-stricken information, for example, a data mining technique can be used. The data mining technique is a method of extracting significant information by applying existing data analysis method such as statistics or pattern recognition to a large amount of data and finding a significant correspondence, pattern, and the like between items from the data. For example, using a text mining technique makes it possible to extract text information including a predetermined keyword and text information associated with the information based on the predetermined keyword and its thesaurus from text information included in disaster information. For example, it is possible to obtain information about a need associated with a disaster by setting, as a keyword, the name of an apparatus expected to become defective, the name of sensor information necessary for confirmation of a disaster situation, or the like.

It is also possible to extract text information using the characteristic language pattern of text for passing a need like "In . . . , . . . is required in order to . . . " in addition to the above keyword. The extracted text information undergoes word extraction by, for example, parsing to extract information about the defective apparatus, a lack of a type of sensor information, a location where the apparatus and sensor information are required, and the like.

In addition to the text mining method, a data mining technique about an image may be used. This makes it possible to estimate an apparatus in a function disable state by obtaining information about the function status of a building or facility associated with the disaster response infrastructure (by obtaining information about the function status of the emergency electric generator of a facility from the illumination status of the facility) by pattern recognition or the like for a disaster-stricken area image.

The request information generator 214 of the disaster information management apparatus 202 specifies the portable terminals 206 existing near the need occurrence location, that is, within a range of a predetermined distance from the need occurrence location based on the terminal information and need information. The request information generator 214 generates and transmits request information for requesting the specified portable terminals 206 to satisfy the need at the location (for example, to restore the defective apparatus function or add sensor information). The request information can include information about a unit (need satisfaction unit) for satisfying the need, in addition to the contents of the need and the need occurrence location.

For example, when restoration of the stopped apparatus function is requested, information about the location and model number of an apparatus as an alternative to the stopped apparatus can be used as information about a need satisfaction unit, which should be included in the request information. Alternatively, when addition of sensor information is requested, information about the location and model number of a sensor apparatus for acquiring the sensor information can be used as information about a need satisfaction unit.

The alternative apparatus or sensor apparatus can be desirably used as it is connected to the portable terminal 206. This enables the user of the portable terminal 206 to satisfy the need using the portable terminal 206 and to quickly restore the function by the alternative apparatus or add the sensor information by only procuring only the apparatus according to the request information.

In addition to the alternative apparatus, a need for restoration of communication of a standalone apparatus such as a standalone signage panel, a traffic light of a road or railroad, or a fixed point camera which has lost the communicator by suffering from the disaster can be included in the need information and request information.

The response information processor 216 (FIG. 2) of the disaster information management apparatus 202 receives response information transmitted by the portable terminal 206, and updates the request information. That is, the response information processor 216 confirms the current position of the portable terminal 206 indicated by the response information, and the activation status of the apparatus by the portable terminal 206, and updates the information by, for example, deleting unnecessary contents of the request information.

The information provider 218 receives measurement data of the sensor apparatus transmitted by the portable terminal 206, processes the measurement data into a readily providable format (for example, a format of a radiation map for radioactivity), and provides the information to another network terminal apparatus. The information provider 218 provides an information providing service of, for example, searching for a safe evacuation route from each area or each address based on the measurement data of the sensor apparatus and the like, and distributing information about the found evacuation route via the network 208.

The program server 204 is a computer including a CPU, a RAM, a ROM, and a communication interface with the network 208. The program server 204 includes a driver database (driver DB) 220 storing function information of the device driver of an apparatus usable by the portable terminal 206 and information about the storage location of the device driver. The program server 204 also includes an application database (application DB) 222 storing function information of an application program executable by the portable terminal 206 and information about the storage location of the application program.

The function information of the device driver or application program includes, for example, an identification code, the model code or number of an apparatus to be controlled, the model code or number of the compatible portable terminal 206, and the name and version of a compatible operating system.

In response to a request from the portable terminal 206, the program server 204 transmits, to the portable terminal 206, a software program including a device driver and/or application program necessary for operating an apparatus connected to the portable terminal 206.

That is, upon receiving a program transmission request transmitted by the portable terminal 206, the program server 204 specifies, from the driver database 220, a device driver for operating an apparatus connected to the portable terminal 206. The program server 204 specifies, from the application database 222, an application program to be used to, for example, control the apparatus and acquire data from the apparatus. The program server 204 transmits a software program (to also be simply referred to as a "program" hereinafter) including the specified device driver and/or application program to the portable terminal 206.

The device driver and application program themselves can be stored in the program server 204, or stored in another server or the like and read out and transmitted by the program server 204. The program server 204 may delegate transmission to another server that stores the device driver and application program by designating the identification codes of the device driver and application program and the identification code of the portable terminal 206 as a transmission destination.

The portable terminal 206 is a computer including a CPU, a RAM, a ROM, and a communication interface with the network 208. The portable terminal 206 is a mobile terminal apparatus which includes a connection interface (or communication interface) (not shown) with an apparatus, and can, for example, control an apparatus connected to the interface by executing an appropriate application program. As the portable terminal 206, for example, a smartphone, tablet terminal, or mobile PC (Personal Computer) can be used. As the connection interface with an apparatus, for example, a USB® (Universal Serial Bus) interface can be used.

The portable terminal 206 includes a downloader 224 and a responder 226. Note that in this embodiment, the downloader 224 and the responder 226 are implemented when the portable terminal 206 as a computer executes a program. The present invention, however, is not limited to this. The downloader 224 and the responder 226 can be arranged as hardware devices for implementing the functions by individual electric circuits.

The downloader 224 receives the request information transmitted by the disaster information management apparatus 202. When the apparatus requested to operate by the request information is connected to the portable terminal 206, the downloader 224 downloads a software program necessary for operating the connected apparatus from the program server 204 via the network 208.

More specifically, the downloader 224 receives, via the wireless base station 230 and the network 208, the request information transmitted by the disaster information management apparatus 202, and specifies an apparatus designated in the information about the need satisfaction unit included in the received request information. In response to connection of the apparatus of the specified model number, the downloader 224 transmits a program transmission request to the program server 204. The downloader 224 then downloads a device driver and application program necessary for operating the apparatus from the program server 204 via the network 208.

Note that the program transmission request is transmitted not only when the apparatus is connected to the portable terminal 206 as described above but also when the user inputs a transmission instruction to the portable terminal 206 after connection. The program transmission request can include the model number of the apparatus connected to the portable terminal 206 and designation of the application program.

Furthermore, setting conditions at the time of occurrence of a disaster may be determined in advance so that the operation conditions of an apparatus and the transmission format of data are in desired states. In this case, it can be assumed that when the downloader 224 transmits the program transmission request, a disaster response application program for operating the apparatus according to the setting conditions is downloaded from the program server 204.

More specifically, it can be assumed that the request information includes designation of a disaster response application program, and the portable terminal 206 transmits a program transmission request including designation of the disaster response application program to the program server 204. Alternatively, information indicating a disaster response may be included in a program transmission request. Upon receiving the program transmission request, the program server 204 may select and transmit the disaster response application program in response to detection of the information indicating a disaster response. Note that the portable terminal 206 can insert the information indicating a disaster response to the program transmission request based on the request information or user input.

The responder 226 operates the apparatus connected to the portable terminal 206 by using the device driver and application program downloaded by the downloader 224. The responder 226 transmits, to the disaster information management apparatus 202, response information indicating a response status to the request from the disaster information management apparatus 202. The response information can include the identification code and current position information of the portable terminal 206, and information about the operation status of the connected apparatus, for example, the model number, operation start time, setting information, and the like of the apparatus.

The operation of the disaster information system 200 will be described next by using a practical example.

FIG. 4 is a view showing an example of a disaster-stricken situation in which the disaster information system 200 operates. In the example shown in FIG. 4, assume that a nuclear power station 444 in a region X is damaged to cause a radioactive leak and the wireless relay station 240 constituting the disaster prevention network of the local government or the like is damaged (for example, an antenna is submerged in water or physically damaged) in the region W, due to, for example, an earthquake. Assume also that communication path of disaster information to the facilities 242w (including, for example, a disaster prevention branch and ordinary house in the region) which rely on sending of information via the wireless relay station 240 has been broken down.

The disaster information sending apparatus 232 provided in an administrative agency or the like includes, for example, a disaster-stricken information database 420 for storing information collected from each local government, which stores information about damage to the wireless relay station 240 in the region W and damage to the nuclear power station 444 in the region X. The disaster information sending apparatus 232 also includes a facility information database 422 which stores information about main facility of each local government (information about apparatuses and equipments in the facility) and the like.

At the time of occurrence of a disaster, the disaster information management apparatus 202 receives disaster information from, for example, the disaster information sending apparatus 232 via the network 208. The need information generator 212 extracts information about a need from the disaster information and disaster-stricken information provided by the knowledge database connected on the network 208 (by using the above-described data mining technique or the like). The disaster information management apparatus 202 detects that there are a need for restoration of the function of the damaged wireless relay station 240 in the region W and a need for addition of radiation dose data along with damage to the nuclear power station 444 in the region X.

The need information generator 212 generates need information by associating the need contents "restoration of the function of the wireless relay station 240" and "addition of radioactivity data" with need occurrence locations, that is, "the installation position of the wireless relay station 240" and "the position of a data shortage area in the region X". Note that the installation position and the position of the area can be acquired as information such as an address, region name, or latitude/longitude from the facility information database 422 of the disaster information sending apparatus 232 or another knowledge database on the network 208.

FIG. 5 is a table showing an example of a need information table 500 generated by the need information generator 212 of the disaster information management apparatus 202 in the situation shown in FIG. 4. In the example shown in FIG. 5, the first field (the leftmost field) indicates a need category (function restoration or information addition), the second field indicates need contents, and the third field indicates a need occurrence location.

Based on the need information generated by the need information generator 212, the request information generator 214 acquires, from the facility information database 422 of the disaster information sending apparatus 232, specification information of the wireless relay apparatus of the wireless relay station 240 for which there is a need for function restoration. The request information generator 214 specifies an alternative apparatus corresponding to the specification information. The request information generator 214 also specifies the location of the specified alternative apparatus from the pieces of equipment information of various facilities stored in the facility information database 422 of the disaster information sending apparatus 232 and the facility information-related database of the local government.

Based on the need information generated by the need information generator 212, the request information generator 214 specifies the model number and location of a radioactivity sensor apparatus for satisfying the need for addition of information from the facility information database 422 and the pieces of equipment information of the facilities stored in the facility information-related database of the local government.

Based on the terminal information acquired by the terminal information acquirer 210, the request information generator 214 generates a request information table for associating the identification ID of the portable terminal 206 existing near the need occurrence location with a need satisfaction unit for satisfying the need at the need occurrence location.

FIG. 6 is a table showing an example of a request information table 600 generated by the request information generator 214 based on the need information shown in FIG. 5. In the example shown in FIG. 6, the first field (the leftmost field) indicates the identification IDs of the portable terminals 206 existing near a need occurrence location, the second field indicates a need classification, the third field indicates need contents, and the fourth field indicates the need occurrence location. As a need satisfaction unit, the fifth field indicates the model numbers of the specified alternative apparatus and sensor apparatus, and the sixth field indicates the location (procurement location) of the specified apparatus.

In the first row (except for the title row), the "identification ID" of the first field indicates the identification IDs of the portable terminals 206 existing near "wireless relay station 240 in region W (address: . . . )" indicated by the "need occurrence location" of the fourth field. Alternative apparatuses existing near the portable terminals 206 and their locations are indicated in the fifth and sixth fields.

On the other hand, in the second to fourth rows, the need occurrence location indicates "entire . . . area of region X" whose range is wide. Therefore, the sixth field indicates the location of a sensor apparatus existing in each area of the region, and the first field indicates the identification IDs of the portable terminals 206 existing near each location indicated in the sixth field. In other words, the sixth field indicates the procurement location of a sensor apparatus closest to the portable terminals 206 having the identification IDs indicated in the first field.

Based on the request information table, the request information generator 214 of the disaster information management apparatus 202 generates, for each of the portable terminals 206 having the identification IDs described in the first field of the table, request information to be transmitted to the portable terminal 206, and transmits the request information to the portable terminal 206. Note that the request information can be transmitted as part of an emergency service such as earthquake early warning generally provided in the portable terminal 206 such as a smartphone by using the apparatus ID of the portable terminal 206.

Figure 7:
FIG. 7 is a table showing an example of request information generated by the request information generator based on the request information table shown in FIG. 6.

FIG. 7 shows a list (part of it) 700 of the pieces of request information generated by the request information generator 214 based on the request information table 600 shown in FIG. 6. Respective items included in the request information are basically the same as those of the request information table shown in FIG. 6, and information on each row provided for each of the identification IDs of the portable terminals 206 of the list shown in FIG. 7 represents the request information generated for each portable terminal 206.

Note that in the example shown in FIG. 7, one piece of request information is generated for each portable terminal 206. If, however, there are a plurality of needs near one portable terminal 206, a plurality of pieces of request information can be generated for the portable terminal 206. Priority levels can be given to the plurality of pieces of request information according to the urgency levels of the needs. Furthermore, weights (for example, expectancy or the like given in a desirable order of model numbers or location positions of the sensors) can be given to the model numbers or location positions (need occurrence locations) of the radioactivity sensors based on estimated measurement accuracy and map information.

The pieces of request information are respectively transmitted to the portable terminals 206 having the identification IDs indicated in the first field, and displayed on the display screen of the portable terminal 206. The display format of the request information in the portable terminal 206 may be the same table format as that shown in FIG. 7, or the table format may be converted into a text format and displayed. In the case of a text format, for example, the respective items included in the request information are expanded to create data "this is request information. (Need contents) are required at a (need occurrence location). A necessary apparatus (apparatus model number) is at a (procurement location)". The above parentheses ( ) indicate contents of a corresponding item in the request information.

Note that generation of need information and generation and transmission of request information are repeated at a predetermined time interval. This updates these pieces of information by the most up-to-date information at the predetermined time interval.

When the request information is displayed on the display screen of the portable terminal 206, the user of the portable terminal 206 decides whether to respond to the request information. When the user responds to the request information, he/she procures an alternative apparatus or sensor apparatus having a model number indicated by "apparatus model number" at a "procurement location" indicated by the request information, goes to a "need occurrence location" indicated by the request information, and connects the procured alternative apparatus and sensor apparatus to the portable terminal 206 at the location. Note that if a plurality of pieces of request information are displayed on the portable terminal 206, the user of the portable terminal 206 decides a piece of request information to respond, and performs the above operation for the decided request information.

For example, the user of the portable terminal 206 having the identification ID who intends to respond to the need for restoration of the function of the wireless relay station 240 procures a wireless communication device 450 (FIG. 4) as an alternative apparatus having the model number indicated by the request information at the procurement location indicated by the information. The user then goes to the location of the damaged wireless relay station 240, and connects the wireless communication device 450 to the portable terminal 206. The downloader 224 of the portable terminal 206 downloads a device driver and application program for operating the wireless communication device 450 from the program server 204, and the responder 226 operates the wireless communication device 450. As a result, the relay function of the wireless relay station 240 is replaced by the wireless communication device 450 and restored, thereby recovering communication of information in the region W.

Figure 8:
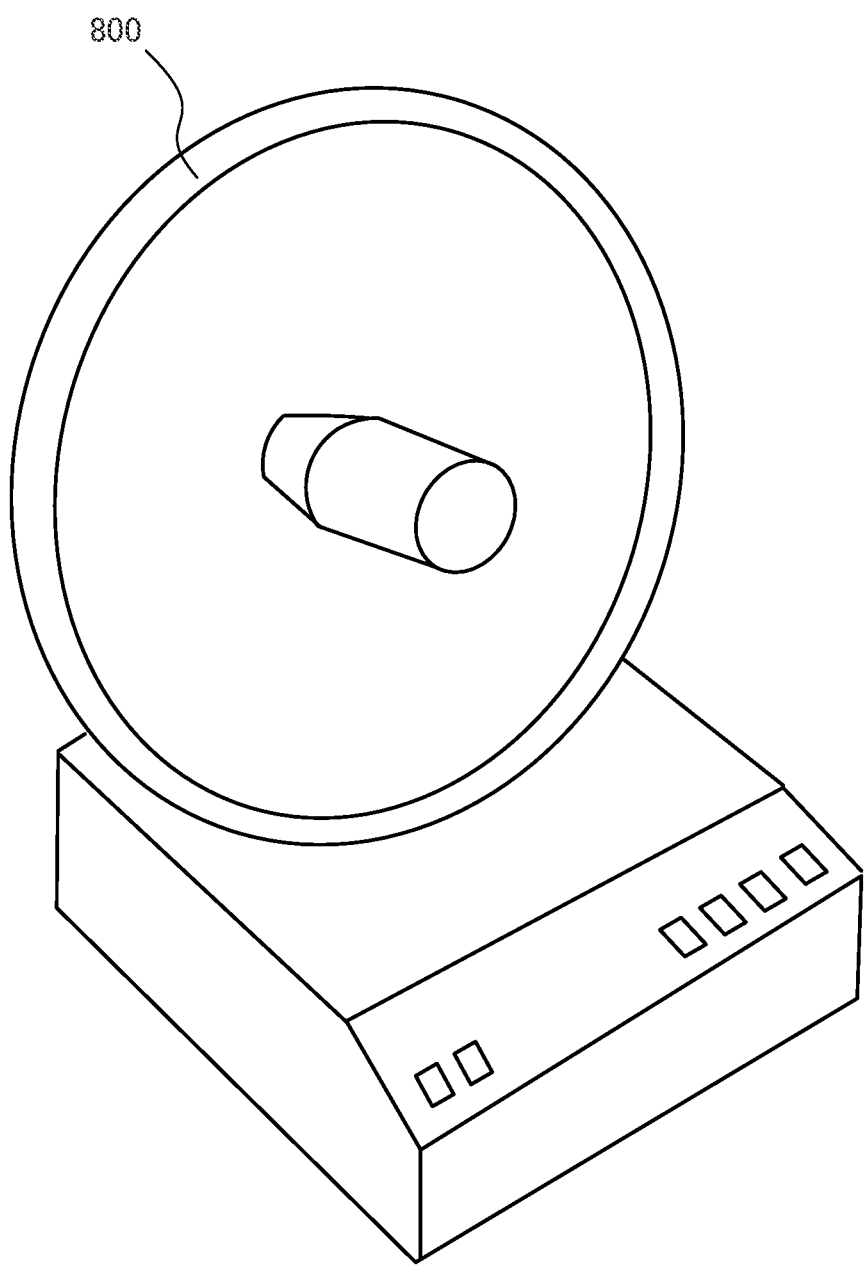
FIG. 8 is a view showing an example of a wireless communication device connected to a portable terminal of the disaster information system according to the second embodiment of the present invention.

As the wireless communication device 450, for example, a wireless communication device 800 having a portable parabolic antenna capable of performing USB connection as shown in FIG. 8 can be used. As a communication method restored by the antenna, various methods such as an outdoor communication method complying with a Wi-MAX or IEEE802.11j/h communication standard and a wireless LAN communication method complying with an IEEE802.11a/b/g/n/ac/ad standard are possible, as needed.

For example, the user of the portable terminal 206 who intends to respond to the need for addition of radioactivity data acquires a radioactivity sensor 452 (FIG. 4) having a model number indicated by the request information at the procurement location indicated by the information. The user goes to an area in the region X as the need occurrence location indicated by the request information, and connects the radioactivity sensor 452 to the portable terminal 206. The downloader 224 of the portable terminal 206 downloads a device driver and application program for operating the radioactivity sensor 452 from the program server 204, and the responder 226 operates the radioactivity sensor 452.

As a result, radioactive measurement is continuously performed at the current position of the portable terminal 206 in the region X, thereby making it possible to grasp a radioactive contamination status which changes every moment without human intervention. Radioactivity data in the region X collected by the disaster information management apparatus 202 suffice according to the number of users of the portable terminals 206, and thus it is possible to create a radioactive map or the like with a large amount of information or high accuracy.

The responder 226 transmits response information including the identification ID of the portable terminal 206, the current position information, the model number of the connected apparatus, the operation start time of the apparatus, and the setting information of the apparatus to the disaster information management apparatus 202.

The response information processor 216 receives the response information, and updates the request information by, for example, deleting the request information associated with the wireless relay station 240 whose function has been restored. The information provider 218 receives the radiation data transmitted by the portable terminal 206 to generate a radiation map or the like or modify a radioactive distribution map provided by the Ministry of Economy, Trade and Industry or the like. The information provider 218 provides the radioactive map itself or evacuation route information generated based on the map to another network terminal apparatus via the network 208.

Note that in the above description, when an apparatus or sensor is connected to the portable terminal 206 at a need occurrence location, a device driver and application program are downloaded and the application program is activated. The present invention, however, is not limited to this. The device driver and application program may be downloaded in advance when the procured apparatus or sensor is connected to the portable terminal 206 at an arbitrary location. In this case, the user instructs the portable terminal 206 to activate the application program when he/she arrives at the need occurrence location. This can reliably operate the apparatus or sensor connected to the portable terminal 206 using the already downloaded program even if the portable terminal 206 cannot be connected to the network 208 at the need occurrence location.

A rainfall sensor, a lightning sensor, a vibration sensor, an image sensor, a volcanic ash accumulation sensor, a carbon dioxide ($CO_2$) sensor, an acidity sensor for measuring the acidity of rainwater or river water, a water level sensor for measuring, for example, the water level of a river, or the like may be connected to the portable terminal 206. The disaster information management apparatus 202 can request the portable terminal 206 to perform measurement using the sensor, generate detailed evacuation route information from information acquired by the sensor in accordance with, for example, a river flood risk or lightning risk, and provide the generated information to the user of the portable terminal 206.

As the apparatus connected to the portable terminal 206, an apparatus which already exists at the need occurrence location and has lost the communicator, for example, a standalone signage panel, a traffic light of a road or railroad, or a fixed point camera can be used. By recovering data communication to the apparatus via the portable terminal 206, it is possible to quickly restore some functions of, for example, displaying an evacuation route on the signage panel, managing transportation travel, and acquiring image information at a specific location, which have suffered from a disaster and stopped in the disaster response infrastructure network.

Figure 9:
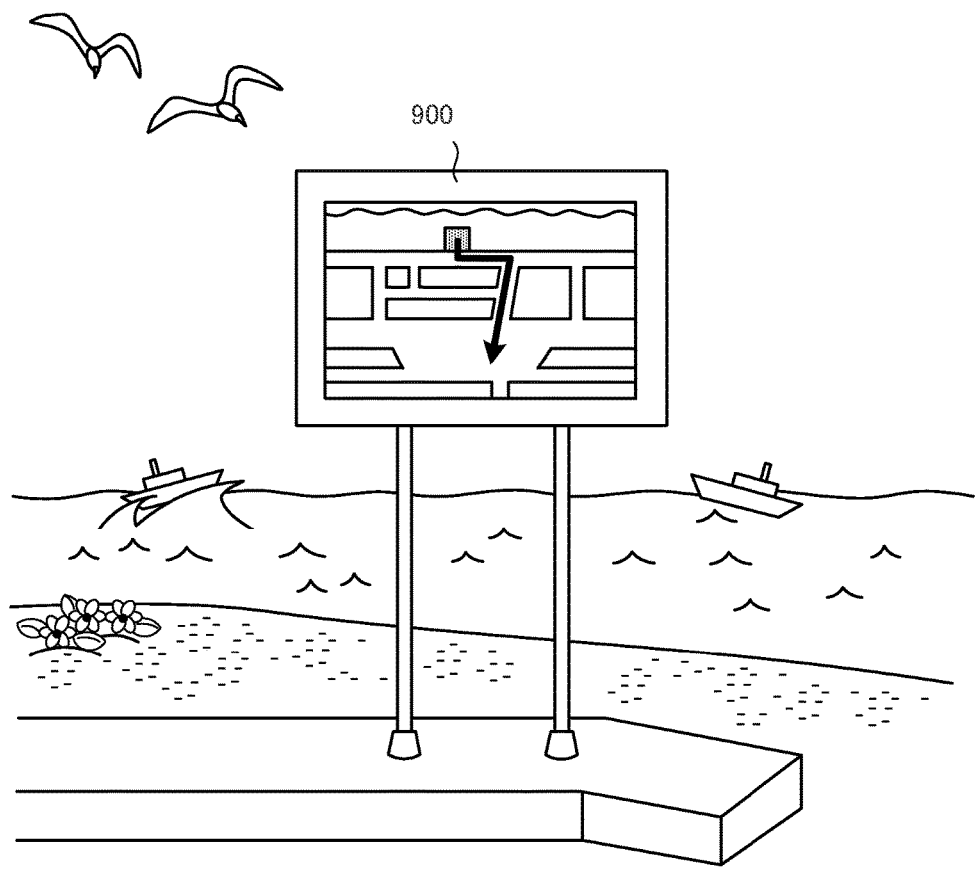
FIG. 9 is a view showing an example of a standalone signage panel connected to the portable terminal of the disaster information system according to the second embodiment of the present invention.

FIG. 9 is a view showing an example of a standalone signage panel 900. Even if the signage panel loses the communicator, it is possible to display an optimum evacuation route at the installation location, as indicated by an arrow in FIG. 9, by restoring communication by connection to the portable terminal 206. Note that an evacuation route can be displayed not only when the signage panel is connected to the portable terminal 206 but also to the single portable terminal 206, and an evacuation route or the like corresponding to the current position of the portable terminal 206 can be displayed on the display screen of the portable terminal 206.

FIG. 4 shows the example in which one apparatus is connected to each portable terminal 206. The present invention, however, is not limited to this, and a plurality of apparatuses may be connected to each portable terminal 206. For example, by forming request information so as to connect a signage panel and radioactive sensor to one portable terminal 206 and arrange them in a radioactive diffusion region, it is possible to attempt to add radioactivity data and display an evacuation route corresponding to the installation location on the signage panel. Furthermore, for example, by connecting a camera and monitor to the portable terminal 206 and installing them in an evacuation site, it is possible to simultaneously grasp the state of the evacuation site and provide information to the evacuation site.

It is also possible to efficiently provide and collect information by connecting a number of apparatuses and sensors such as a crime prevention display monitor, telephotographic camera, radioactivity sensor, microphone, and monitor touch panel to one portable terminal 206, as needed.

The operation procedure of the disaster information system 200 will be described with reference to a flowchart shown in FIG. 10. In FIG. 10, the right side shows the operation sequence of the disaster information management apparatus 202 and the left side shows the operation sequence of the portable terminal 206. Block arrows between the right and left operation sequences indicate exchange of information by communication. This operation starts when the disaster information management apparatus 202 receives disaster information from the network 208.

Note that upon power-on of the disaster information management apparatus 202, the terminal information acquirer 210 continuously receives terminal information transmitted by each portable terminal 206 at a predetermined time interval, and stores it in a storage device such as the auxiliary storage device 308, regardless of the operation shown in FIG. 10.

After the start of the operation, the disaster information management apparatus 202 receives disaster information, especially, information (disaster-stricken information) about a disaster-stricken situation from the network 208 (S1011), and uses the need information generator 212 to generate need information by extracting information about a need from the disaster-stricken information (S1012). Note that the disaster-stricken information can be received in step S1011 by transmitting an information transmission request to a predetermined knowledge database connected on the network 208.

The request information generator 214 specifies the portable terminals 206 existing near a need occurrence location based on the terminal information and the need information (S1013). The request information generator 214 generates and transmits request information for requesting each of the specified portable terminals 206 to satisfy the need at the location (for example, to replace the defective apparatus function or add sensor information) (S1014).

Each portable terminal 206 receives the request information, and displays it on the display screen (not shown) (S1021). In response to this, the user can decide a response to the request, and connect an apparatus or sensor indicated by the request information. The downloader 224 of the portable terminal 206 detects connection of the apparatus or sensor (S1022), and downloads a device driver and application program for operating the apparatus or sensor from the program server 204 (S1023). The responder 226 activates the application program to start the operation of the apparatus or sensor (S1024). The responder 226 transmits response information to the disaster information management apparatus 202 (S1025), and continues the started operation of the apparatus or sensor (S1026).

The response information processor 216 of the disaster information management apparatus 202 receives the response information from the portable terminal 206, and updates the request information (S1015). If the portable terminal 206 transmits sensor data or the like, the information provider 218 receives the data, and generates providing information such as a radioactive map based on the received sensor information (S1016). Furthermore, for example, the process returns to step S1012 to repeat the processing at a predetermined time interval.

Note that when the disaster information management apparatus 202 is powered off or the operator inputs information indicating end of the disaster state, the operation of the disaster information management apparatus 202 ends. When the portable terminal 206 is powered off or the connected apparatus is detached from the portable terminal 206, the operation of the portable terminal 206 ends.

As described above, according to this embodiment, the disaster information management apparatus extracts need information from disaster-stricken information collected from the network, and specifies portable terminals existing near a need occurrence location based on the need information. The disaster information management apparatus then transmits request information for requesting to satisfy the need at the location to each of the specified portable terminals, and collects response information from the portable terminal. This allows the disaster information management apparatus to flexibly collect necessary objective information from a disaster region. It is also possible to promote restoration of a defective function in the disaster response infrastructure network.

[Third Embodiment]

A disaster information system according to the third embodiment of the present invention will be described next. This embodiment intends to provide a more advanced service to the disaster information management apparatus 202 of the disaster information system 200 according to the second embodiment. Knowledge such as an evaluation result and case about the effect of a response of the local system at the time of a disaster is stored in a knowledge database of the local apparatus, and need information and request information are created based on the information stored in the knowledge database.

According to this embodiment, it is possible to generate need information and request information more appropriately and quickly based on past experience by using the knowledge database of the local system and another knowledge database on the network, thereby providing a more advanced information service.

FIG. 11 is a block diagram showing the arrangement of a disaster information system according to this embodiment. Note that the same reference numerals as those in FIG. 2 in the second embodiment denote the same components.

A disaster information system 1100 has the same arrangement as that of the disaster information system 200 of the second embodiment except that a disaster information management apparatus 1102 is included instead of the disaster information management apparatus 202.

The disaster information management apparatus 1102 has the same arrangement as that of the disaster information management apparatus 202 (FIG. 2) according to the second embodiment except that a knowledge database 1160 and a knowledge manager 1162 for managing storage of information in the knowledge database 1160 are further included. The knowledge database 1160 can be stored in, for example, an auxiliary storage device 308 (FIG. 3). The knowledge manager 1162 can be implemented when the disaster information management apparatus 1102 as a computer executes a program, or arranged as a hardware device for implementing the function by an electric circuit.

The disaster information management apparatus 1102 also includes a need information generator 1112 and a request information generator 1114 instead of the need information generator 212 and the request information generator 214 in the second embodiment. The need information generator 1112 and the request information generator 1114 respectively generate need information and request information based on a need, a guide, and the like obtained from the information stored in the knowledge database 1160.

The knowledge DB 1160 includes a countermeasure evaluation database 1172, a case database 1174, an valuator database 1176, a response scene database 1178, and a measurement apparatus database 1180.

The countermeasure evaluation database 1172 stores information (countermeasure evaluation information) about a countermeasure at the time of a disaster. This information includes, for example, information such as a result of measuring the effect of a service provided by the disaster information system 1100 at the time of the disaster, an evaluation result about the satisfaction status of a need, and a need extraction keyword about a need newly found from information communicated on the network 208 at the time of the disaster. For example, a result of specifying a communicable range actually recovered by a combination of a portable terminal 206 and wireless communication device 450 shown in FIG. 4 can be set as a service effect measurement result. Furthermore, a bias of observation point arrangement grasped from radioactivity data collected by combinations of portable terminals 206 and radioactivity sensors 452 or the like can be set as a service effect measurement result. The need extraction keyword can be, for example, a word whose appearance frequency is equal to or higher than a predetermined level in information communicated on the network 208.

The measurement result, keyword, and the like can be extracted from text sent by an SNS onto the network 208 or tweet text sent by Twitter® by using language analysis software such as a semantic analysis engine based on the data mining technique. Information of the measurement result and keyword can also be obtained from the website of a valuator stored in the valuator database 1176. Furthermore, it is possible to grasp a communication recovery status (communication recovery region) by specifying a position where text is sent based on position information or an IP address added to the text information sent from the SNS or the like. Then, the grasped communication recovery status can be stored in the countermeasure evaluation database 1172 as an effect measurement result.

The case database 1174 stores case information about a disaster-stricken situation for each region. For example, the case database 1174 stores case information indicating that an evacuation from a nursing home, a hospital, or the like was difficult in an evacuation route indicated at the time of a past disaster in a specific region, and case information indicating that a detailed evacuation route guidance instruction was needed since there were many elderly people. These pieces of information can also be obtained from text information communicated on the network 208, similarly to the effect measurement information.

The valuator database 1176 stores valuator information for associating a valuator such as an administrative agency, a department of a local government, or a third-party institution who has revealed an evaluation result about a disaster with an information acquisition method from the valuator. For example, the Nuclear Regulation Authority as an administrative agency, the disaster prevention department or public relations department of a prefectural office as a department of a local government, or a laboratory or researcher of a university as a third-party institution can be a valuator. The address of a website used by each valuator to reveal the evaluation result can be used as the information acquisition method. Note that, for example, the operator of the disaster information management apparatus 1102 can input in advance the valuator information to the valuator database 1176.

The response scene database 1178 stores disaster scene information for associating an occurrence situation of a disaster with disaster-stricken information which is unique to the occurrence situation and an occurrence region. The disaster-stricken scene information includes, for a disaster occurrence situation such as a complex disaster of a combination of different kinds of disasters like coincidence of an earthquake and a tsunami, areas where such occurrence situation can occur, an area requiring an evacuation and an area requiring protection among the areas, and a protection method unique to the area.

In addition, for a combination of an earthquake and fire, a combination of an earthquake, a tsunami, and radioactivity, or a disaster occurrence situation in which rainfall or strong wind occurs simultaneously with each combination, disaster-stricken scene information can be formed by including region-specific disaster-stricken information such as a landslide or dam failure. Note that the disaster-stricken scene information can be extracted from text communicated on the network 208 or input by the operator of the disaster information management apparatus 1102.

The measurement apparatus database 1180 stores apparatus information about the location (position) and function of a measurement apparatus needed to generate request information. The apparatus information can include knowledge (information) about a temporary alternative when a dedicated measurement apparatus is difficult to procure or when an emergency response is required. For example, the apparatus information can store, as an alternative to an ombrometer, a method of measuring the amount of rainfall by a measuring cylinder and USB camera. When urgently measuring the amount of radioactive rain caused by a sudden radioactive disaster, it is possible to immediately start measuring the amount of radioactive rain by generating request information based on the alternative to save the time to procure an ombrometer. Also, in the event of a sudden heavy rain, it is possible to generate and transmit request information for requesting measurement of the amount of rain at a location such as a railroad side, at which an urgent disaster countermeasure needs to be taken, by using the alternative of measuring the amount of rainfall, and temporarily collect measurement data during the heavy rain. Instead of the method of measuring the amount of rain, a method of measuring the contamination amount and accumulation amount of radioactive ash by a dish, radioactivity meter, and camera can be included in apparatus information and stored as an alternative of measuring the amount of radioactive ash and a radiation dose.

When an instruction is input at a predetermined time interval or input by the operator, the knowledge manager 1162 receives text information of an SNS or tweet text (text information) from the network 208. The knowledge manager 1162 performs semantic analysis for the text information to extract countermeasure evaluation information, case information, or disaster-stricken scene information. Based on the extracted countermeasure evaluation information, case information, and disaster-stricken scene information or countermeasure evaluation information, case information, and disaster-stricken scene information input by the operator, the knowledge manager 1162 updates contents stored in the knowledge database 1160.

The need information generator 1112 and the request information generator 1114 generate need information, similarly to the need information generator 212 and request information generator 214 in the second embodiment. More particularly, to generate need information and request information, the need information generator 1112 and the request information generator 1114 refer to various kinds of information stored in the knowledge database 1160, and generate more appropriate need information and request information based on a need, a guide, and the like obtained from the information stored in the knowledge database 1160. Generation of need information and request information based on the information stored in the knowledge database 1160 is performed as follows.

(1) Generation of Need Information Using Countermeasure Evaluation Database 1172

1) Use of Need Extraction Keyword Information

The need information generator 1112 can quickly extract an appropriate need from information communicated on the network 208 by referring to countermeasure evaluation information about a need extraction keyword stored in the countermeasure evaluation database 1172 and using the need extraction keyword.

2) Use of Effect Measurement Information

When the need information generator 1112 extracts a need for restoration of the communication function of the wireless relay station 240, the request information generator 1114 refers to the countermeasure evaluation information about effect measurement stored in the countermeasure evaluation database 1172. By referring to the countermeasure evaluation information, whether a communication disable region remains in a communication function restoration response at the time of the last disaster is grasped. The request information generator 1114 determines whether it is necessary to distribute and arrange the wireless communication devices 450 to restore the entire communication range covered by the damaged wireless relay station 240. The request information generator 1114 generates request information by deciding the arrangement locations of the wireless communication devices 450 based on the determination result.

(2) Generation of Need Information and Request Information Using Case Database 1174

If, for example, the need information generator 1112 detects a need for an evacuation of people with movement difficulty to move in a nursing home, a hospital, or the like, the request information generator 1114 refers to the case information stored in the case database 1174. An evacuation route for people with movement difficulty is searched for by avoiding an evacuation route added with, for example, information indicating movement difficulty, and it is determined based on map information and the like whether display units for guiding a route are arranged at main branch points and the like of the found evacuation route. If display units for guiding the evacuation route are short, the request information generator 1114 can generate, to the portable terminal 206, request information indicating that, for example, a monitor is connected and arranged at a designated location to request to satisfy a need for display unit arrangement.

Similarly, for a need for an evacuation of disaster victims, the request information generator 1114 grasps the presence/absence of a problem about an evacuation route of elderly people by referring to the case information stored in the case database 1174. If there is a problematic evacuation route, the request information generator 1114 generates request information for arranging a display monitor at an appropriate location on an appropriate evacuation route which avoids the problematic evacuation path, in order to indicate the appropriate route to each elderly person within a region in accordance with his/her address. Note that as long as an elderly person database for the addresses of elderly people is prepared in each local government, the address of each elderly person can be acquired from the elderly person database via the network 208.

(3) Generation of Need Information and Request Information Using Response Scene Database 1178

When a complex disaster such as an "earthquake and tsunami" is detected from text information and the like communicated on the network 208, the need information generator 1112 refers to the disaster-stricken scene information stored in the response scene database 1178. The need information generator 1112 specifies a region which suffers from a disaster at high probability and a disaster-stricken situation unique to the region, thereby preferentially detecting a need corresponding to the region and disaster-stricken situation. The request information generator 1114 can generate request information so as to preferentially request to satisfy such need.

(4) Generation of Request Information Using Measurement Apparatus Database 1180

To generate request information from need information, the request information generator 1114 can acquire the location of an apparatus necessary for satisfying a need indicated by the need information from the measurement apparatus database 1180. If there is no necessary measurement apparatus within a predetermined distance range from a need occurrence location, the request information generator 1114 can specify an alternative to the function of the necessary measurement apparatus from apparatus information, and generate request information based on a material necessary for the alternative and its location. When request information for using such alternative is generated, the request information can include information about a measurement method using the alternative, for example, image information ideating a combination of apparatuses or materials. For the above-described alternative of measuring the amount of rain, it is possible to present an example of installation of a combination of a measuring cylinder and camera as an image, and request the recipient of the request information to perform effective measurement. Note that information about the measurement method can be presented by including it in the request information as described above, or can be presented by including the address of a website indicating the location of the information in the request information.

As described above, the disaster information system 1100 according to this embodiment can store past information about a disaster as knowledge in a database, and use it. This enables the disaster information system 1100 to newly take a more appropriate and efficient countermeasure by using a lesson (for example, remaining of a communication disable region) at the time of the last disaster as knowledge, and implementing effective cooperation between the knowledge and the portable terminal 206.

Note that the knowledge can be reflected on not only grasp of a need and generation of request information but also contents of information provided by the information provider 218. For example, although various kinds of information are provided at the time of a disaster, the priority levels of the pieces of information to be provided can be changed for each region by referring to the case information in the case database 1174 at the time of providing information and, for example, the update frequencies and providing order of the pieces of information can be changed in accordance with the priority levels. Furthermore, a disaster that may occur along with a disaster which currently occurs, for example, a landslide at the time of rain which may occur in the same region in addition to a collapse of a building at the time of an earthquake is predicted by referring to the disaster-stricken scene information in the response scene database 1178, thereby avoiding the location of the collapse of the building. Furthermore, it is possible to present an evacuation route to avoid in advance a route (which can be obtained from the case information in the case database 1174 and the like) in which a slide disaster occurred in the past.

As described above, it is possible to perform an bidirectional operation of transmitting request information about the operation of an apparatus from the disaster information management apparatus to the portable terminal and returning response information including information about the execution status of the operation of the apparatus from the portable terminal which has received the request information.

This can flexibly collect necessary objective information from a necessary location in accordance with a disaster situation which changes every moment instead of conventionally collecting subjective information returned from the portable terminal user. Furthermore, it is possible to promote restoration of a defective function in a disaster response infrastructure network, and extend the range of a provided service.

The disaster information system according to this embodiment extracts information about the effect of a service provided by itself, case information, and the like from text information sent from the knowledge database on the network. The system can store, in itself, the extracted information as knowledge for coping with a disaster. This disaster information system can more quickly and appropriately satisfy a need arising at the time of a disaster by learning the lesson of the past.

[Other Embodiments]

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention on the computer, a medium storing the program, and a WWW (World Wide Web) server that causes a user to download the program.

This application claims the benefit of Japanese Patent Application No. 2012-224210 filed on Oct. 9, 2012, which is hereby incorporated by reference herein in its entirety.

The invention claimed is:

1. A disaster information management apparatus connected to a network, comprising:

a terminal information acquirer that acquires terminal information including current positions and identification information of portable terminals connected to the network;

a need information generator that generates, from disaster information received from the network, need information including a need which can be added by an operation of a new apparatus and information about an occurrence location of the need;

a request information generator that generates, based on the terminal information and the need information, request information for requesting at least one of the portable terminals, existing within a range of a predetermined distance from the occurrence location of the need, to connect and operate the new apparatus, and transmits the request information; and a receiver that receives information obtained by the new apparatus which was connected to the portable terminal and operated by the portable terminal based on the request information.

2. The disaster information management apparatus according to claim 1, wherein the need information is generated based on information which has been extracted from the disaster information using a predetermined keyword.

3. The disaster information management apparatus according to claim 2, wherein the predetermined keyword is extracted by performing semantic analysis for text information included in the disaster information.

4. The disaster information management apparatus according to claim 1, further comprising:
a knowledge database that stores an evaluation result about a satisfaction status of the need by the apparatus which has been connected to the portable terminal and operated based on the request information,
wherein said need information generator and said request information generator generate the need information and the request information, respectively, based on the need obtained from the evaluation result by referring to the evaluation result stored in said knowledge database at the time of generation of the need information and the request information.

5. The disaster information management apparatus according to claim 4, further comprising:
a knowledge manager that evaluates the satisfaction status of the need by the apparatus which has been connected to the portable terminal and operated based on the request information, and stores an evaluation result in said knowledge database.

6. The disaster information management apparatus according to claim 4, wherein
said knowledge database stores disaster-stricken scene information including region-specific disaster-stricken information about a complex disaster of a combination of different kinds of disasters, and
said need information generator and said request information generator generate the need information and the request information, respectively, based on the need obtained from the disaster-stricken information included in the disaster-stricken scene information by referring to the disaster-stricken scene information stored in said knowledge database at the time of generation of the need information and the request information.

7. The disaster information management apparatus according to claim 1, further comprising:
an information provider that generates an evacuation route information based on the disaster information,
wherein said request information generator generates request information for requesting to arrange a display device as the apparatus to connect to the portable terminal on an evacuation route indicated by the evacuation route information generated by said information provider, and sends the request information.

8. The disaster information management apparatus according to claim 7, wherein the evacuation route information is generated in accordance with an address of each elderly person obtained from an elderly person database connected onto the network.

9. The disaster information management apparatus according to claim 1, wherein the apparatus necessary for adding the need includes at least one of a wireless communication device, a display monitor, a camera, a signage panel, a radioactivity sensor, a rainfall sensor, a lightning sensor, a vibration sensor, a volcanic ash accumulation sensor, a carbon dioxide (CO2) sensor, an acidity sensor, and a water level sensor.

10. A disaster information system comprising:
a disaster information management apparatus defined in claim 1;
a portable terminal that is connected to a network and has a function of connecting and operating an apparatus; and
a program server that is connected to the network and transmits, to said portable terminal, a software program necessary for operating the apparatus connected to said portable terminal in response to a request from said portable terminal,
said portable terminal including
a downloader that receives request information transmitted by said disaster information management apparatus, and downloads, in response to connection of an apparatus requested to operate by the request information, a software program necessary for operating the connected apparatus from said program server via the network, and
a responder that operates the connected apparatus using the downloaded software program, and transmits, to the disaster information management apparatus, information about the apparatus which was connected and operated.

11. The portable terminal communicably connected, via the network, to the disaster information management apparatus according to claim 1, comprising:
a connection interface with the apparatus;
a downloader that receives the request information transmitted by the disaster information management apparatus, and downloads, in response to connection of the apparatus requested to operate by the request information to said connection interface, a software program necessary for operating the apparatus from a server via the network; and
a responder that operates the apparatus connected to said connection interface by executing the downloaded software program, and transmits, to the disaster information management apparatus, response information which includes information about an operation status of the apparatus and indicates a response status to the request, as information about the apparatus.

12. A control method of the portable terminal communicably connected, via the network, to the disaster information management apparatus according to claim 1, comprising:
receiving the request information transmitted by the disaster information management apparatus;
downloading, in response to connection of the apparatus requested to operate by the request information to a connection interface of a local apparatus, a software program necessary for operating the apparatus from a server via the network;
operating the apparatus connected to the connection interface by executing the downloaded software program; and
transmitting, to the disaster information management apparatus, response information which includes information about an operation status of the apparatus and indicates a response status to the request, as information about the apparatus.

13. A non-transitory computer readable medium storing a control program, of controlling the portable terminal communicably connected, via the network, to the disaster information management apparatus according to claim 1, for causing a computer to execute a method, comprising:
receiving the request information transmitted by the disaster information management apparatus;

downloading, in response to connection of the apparatus requested to operate by the request information to a connection interface of a local apparatus, a software program necessary for operating the apparatus from a server via the network;
operating the apparatus connected to the connection interface by starting execution of the downloaded software program; and
transmitting, to the disaster information management apparatus, response information which includes information about an operation status of the apparatus and indicates a response status to the request, as information about the apparatus.

14. A disaster information management method of a disaster information management apparatus connected to a network, comprising:
    acquiring terminal information including current positions and identification information of portable terminals connected to the network;
    generating, from disaster information received from the network, need information including a need which can be added by an operation of a new apparatus and information about an occurrence location of the need;
    generating, based on the terminal information and the need information, request information for requesting at least one of the portable terminals existing within a range of a predetermined distance from the occurrence location of the need, to connect and operate the new apparatus and transmitting the request information; and
    receiving information obtained by the new apparatus which was connected to the portable terminal and operated by the portable terminal based on the request information.

15. A disaster information management method comprising:
    causing a disaster information management apparatus connected to a network to acquire terminal information including current positions and identification information of portable terminals connected to the network;
    causing the disaster information management apparatus to generate, from disaster information received from the network, need information including need which can be added by an operation of a new apparatus and information about an occurrence location of the need;
    causing the disaster information management apparatus to generate, based on the terminal information and the need information, request information for requesting at least one of the portable terminals existing within a range of a predetermined distance from the occurrence location of the need, to connect and operate the new apparatus and transmit the request information;
    causing the portable terminal to receive and display the request information;
    causing the portable terminal to download, in response to connection of the apparatus requested to operate by the request information, a software program necessary for operating the connected apparatus from a program server via the network;
    causing the portable terminal to operate the connected apparatus using the downloaded software program, and transmits, to the disaster information management apparatus, information about the new apparatus which was connected and operated; and
    receiving information obtained by the new apparatus which was connected to the portable terminal and operated by the portable terminal based on the request information.

16. A disaster information management program for causing a computer to execute a method, comprising:
    acquiring terminal information including current positions and identification information of portable terminals connected to a network;
    generating, from disaster information received from the network, need information including need which can be added by an operation of a new apparatus and information about an occurrence location of the need;
    generating and the need information, request information for requesting at least one of the portable terminals existing within a range of a predetermined distance from the occurrence location of the need, to operate the new apparatus and transmitting the request information;
    receiving information obtained by the apparatus which was connected to the at least one portable terminal and operated by the at least one portable terminal.

* * * * *